United States Patent [19]

Griffith

[11] 4,358,232
[45] Nov. 9, 1982

[54] VEHICLE LOAD RETAINING APPARATUS

[76] Inventor: Seborn E. Griffith, 11221 Pipeline, Pomona, Calif. 91766

[21] Appl. No.: 129,094

[22] Filed: Mar. 10, 1980

[51] Int. Cl.³ ............... B65D 63/00; B61D 45/00
[52] U.S. Cl. ............... 410/100; 24/68 CD; 24/136 K; 248/499; 410/36
[58] Field of Search ........... 410/34, 36, 37, 97, 410/100, 103, 96, 99, 20, 21; 248/499; 24/136 K

[56] References Cited

U.S. PATENT DOCUMENTS

| | | | |
|---|---|---|---|
| 2,539,997 | 1/1951 | Graves | 224/42.4 |
| 2,557,499 | 6/1951 | Davis | 410/97 |
| 2,604,678 | 7/1952 | Mayes | 24/68 CD |
| 2,611,164 | 9/1952 | Meighan et al. | 24/68 CD |
| 2,630,609 | 3/1953 | Bus | 24/68 CD |
| 2,858,774 | 11/1958 | Batten | 410/97 |
| 2,867,406 | 1/1959 | Davis | 410/97 |
| 2,932,871 | 4/1960 | Phillips et al. | 24/136 K |
| 3,222,745 | 12/1965 | Palmleaf et al. | 24/269 |
| 3,290,010 | 12/1966 | Holmes | 410/97 |
| 3,423,800 | 1/1969 | Davis | 410/97 |
| 3,653,334 | 4/1972 | Meier | 410/97 |
| 3,954,252 | 5/1976 | Lyons | 254/78 |
| 3,961,585 | 7/1976 | Brewer | 410/97 |
| 4,257,644 | 3/1981 | Stephens | 410/96 |

*Primary Examiner*—Richard A. Bertsch
*Attorney, Agent, or Firm*—William P. Green

[57] ABSTRACT

Apparatus for retaining a load on a truck or other vehicle and including a belt connectable to one side of the vehicle bed and extending upwardly over the load to a location near the other side, a chain connectable at one end to the second side of the vehicle and carrying at its other end a buckle adjustably connectable to the belt to secure it through the chain to the second side of the vehicle, and a load binder connectable to different links of the chain and actuable to pull those links toward one another and thereby take up slack in the chain and tighten the belt on the load.

7 Claims, 5 Drawing Figures

VEHICLE LOAD RETAINING APPARATUS

BACKGROUND OF THE INVENTION

This invention relates to improved apparatus for retaining a load on the bed of a truck or other vehicle.

One of the conventional methods of securing a load on an open flatbed truck utilizes a number of retaining belts or straps, each of which is attached at the first end to one side of the truck bed and then extends upwardly over the load to its opposite side for attachment at that location in a manner exerting a binding force on the load urging it tightly downwardly against the bed. In such an arrangement, one end of the belt is normally attached to a winch, which is actuable to tighten the belt as much as is necessary in order to secure the load. A problem which has been encountered in such arrangements involves the difficulty of providing enough winches at enough different locations to effectively secure the load. For example, optimum retention of the load would require in most instances that a strap be provided at the very back of the truck bed, but the construction of most trucks is such that there is inadequate space at that location for mounting of a winch. Similarly, it would be desirable in most cases to provide a belt at the location of the back tandem wheels of a truck. However, there is insufficient space at that location for effective mounting of a winch, and if an attempt is made to so locate a winch it often interferes with the wheels and may be contacted by the wheels or tires in transit.

SUMMARY OF THE INVENTION

The major purpose of the present invention is to provide improved means for taking up the slack in a belt of the discussed type, and tightening it on a vehicle load, without the necessity for providing a winch in association with the belt. Further, an arrangement embodying the invention attains the desired take-up action without occupying as much space as a winch, is more convenient than most winches in operation and use, and may be less expensive than a winch. At the same time, however, a belt utilized in the present arrangement may be a completely conventional type of belt essentially the same as those heretofore used in conjunction with winches. A further advantage of the invention resides in the very positive manner in which an apparatus embodying the invention holds a load and remains in tightened condition, without any danger of loosening under vibrational effects or other forces encountered on the road.

Structurally, an arrangement formed in accordance with the invention includes a chain which is connected at one end to a side of the vehicle bed, and which is connected at its opposite end to a buckle adapted to receive and adjustably connect the chain to the free end of a belt whose opposite end is secured to the second side of the truck bed. The chain and belt together thus form a composite assembly which extends across the top of the load and can be adjusted by the buckle to conform essentially to the load. In conjunction with this chain and belt combination, I utilize a load binder, which is connectable to the chain and acts to take up slack therein. The chain binder may be connected to different links of the chain, or otherwise be connected to take up the slack, and has an actuating arm which swings between two different positions and functions when so actuated to tighten the belt against the load.

The buckle for attachment to the belt end preferably includes an element containing an opening through which the belt can extend first in one direction and then back in the opposite direction in a manner forming a loop at a side of the element through which a retaining member extends in a manner holding the loop and connecting the belt to the buckle in any of a series of different possible adjusted positions. The retaining member which extends through the loop may be a pin of a length greater than the length of the opening through which the belt extends, and adapted to bridge across that opening and engage the element at opposite ends of the opening to hold the retaining pin or element against movement through the opening and at the side of the element at which the loop is formed. The retaining pin may be attached to the buckle element which contains the opening through which the belt extends by a flexible chain or other flexible member retaining the pin against loss but permitting it to be removed from within the belt loop when it is desired to detach the belt from the buckle or adjust it. The end of the chain which is connected to the truck bed may carry a hook for attachment to a hook rail under the bed or for attachment to a link of the chain near its end to form a loop in the chain connectable to the bed through a stake pocket.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENT

Figure 1:
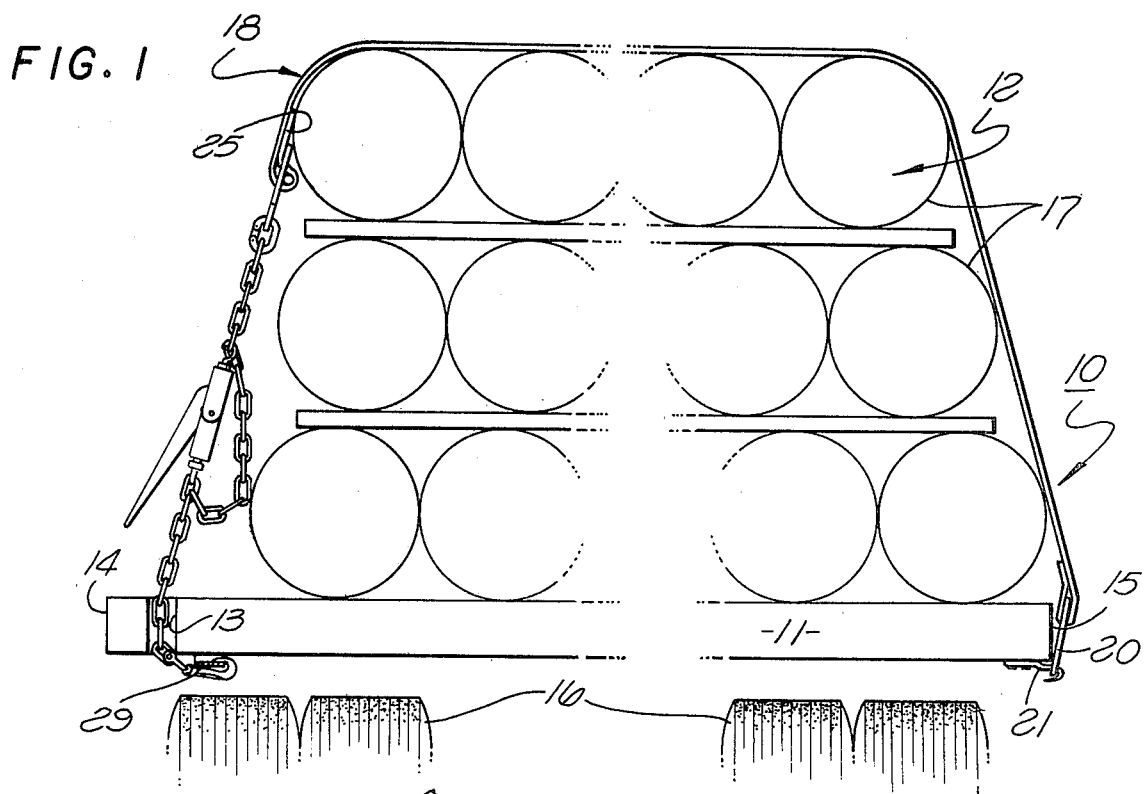
FIG. 1 is a somewhat diagrammatic representation of a truck having a load retained by apparatus of the present invention, the view showing the arrangement as it appears looking forwardly at the back of the truck.

In FIG. 1, there is represented at 10 an open flatbed truck or trailer having a horizontal bed 11 on which the load 12 to be transported is carried. The bed has the usual series of stake pockets or openings 13 extending downwardly through the bed at locations spaced along the opposite side edges 14 and 15 of the bed. The rear tandem wheels of the vehicle are represented at 16. In FIG. 1, the load 12 is typically illustrated as consisting of a number of pipes 17 stacked on the horizontal bed 11 and extending in a front to rear direction.

Figure 4:
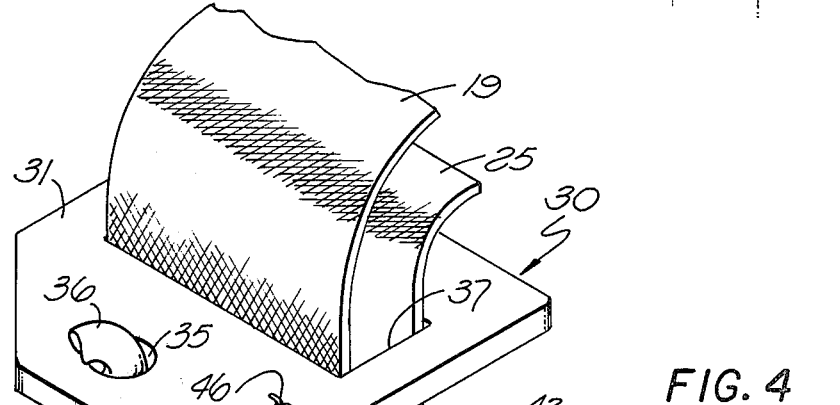
FIG. 4 is a perspective view showing the buckle of the device.
Figure 2:
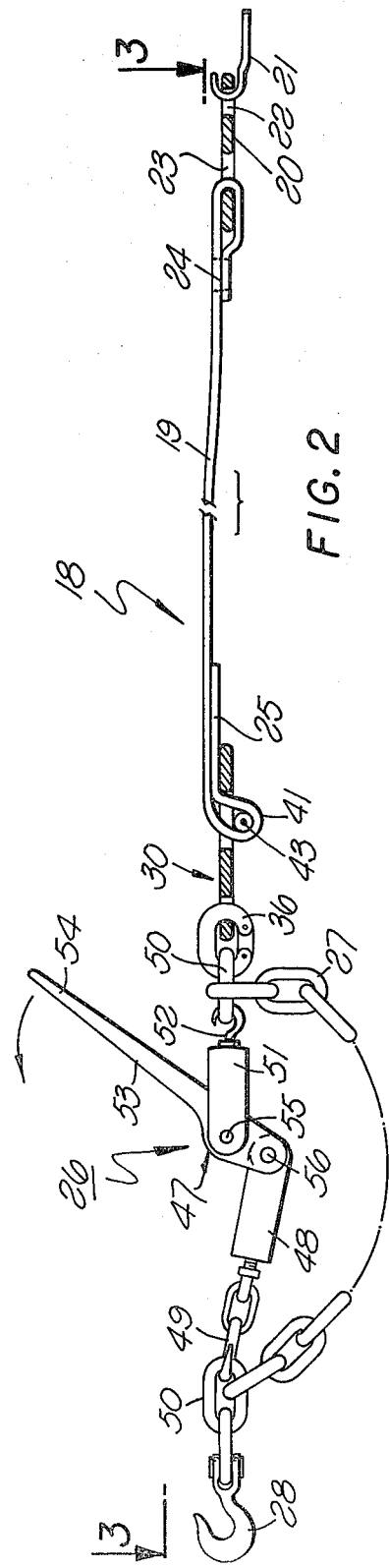
FIG. 2 is an enlarged representation of one of the load retaining assemblies embodying the invention, with the various parts being illustrated in an extended essentially straight line condition to simplify and clarify the figure.
Figure 3:
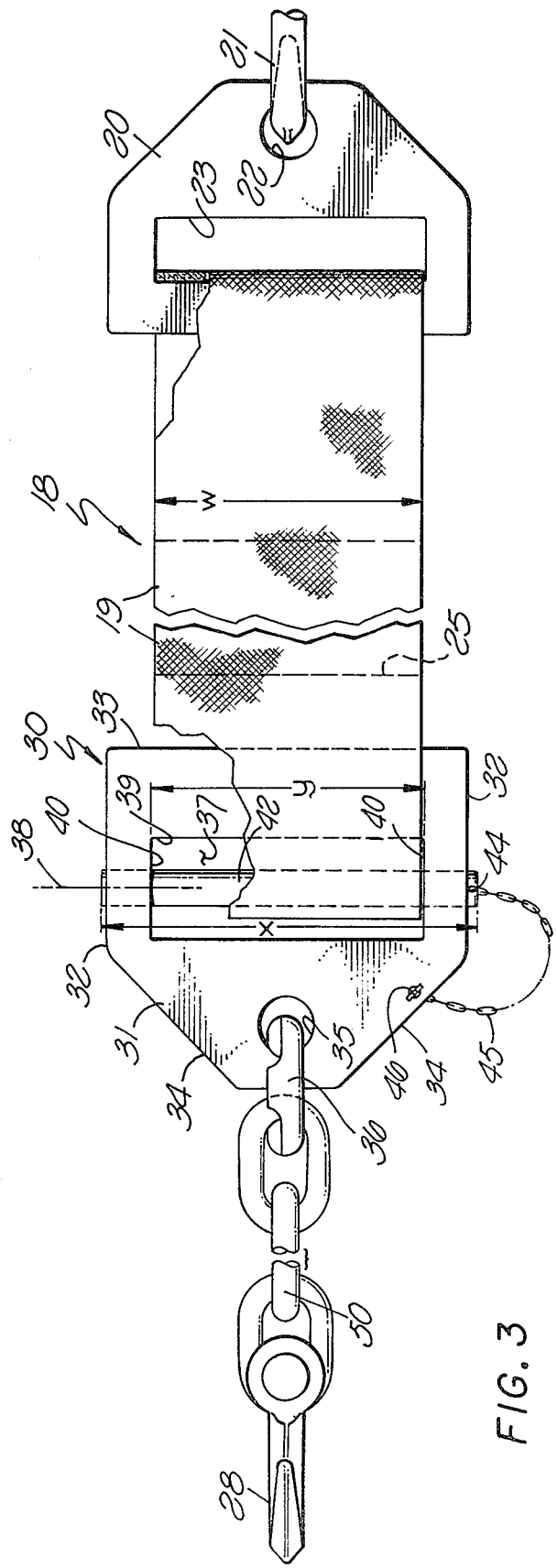
FIG. 3 is a further enlarged fragmentary view taken on line 3—3 of FIG. 2.

In order to secure the pipes 17 on bed 11 in restrained and confined condition during travel, I provide a number of load retaining assemblies 18 at different locations along the length of the pipes. These assemblies 18 are connected at their opposite ends to the opposite side edge portions 14 and 15 of the truck bed, and extend upwardly over the top of the load and are tightened downwardly against the load as illustrated in FIG. 1. FIGS. 2, 3 and 4 illustrate one of these retaining assemblies in detail.

As seen in FIG. 2, each of the assemblies 18 includes an elongated belt or strap 19, which may be formed of nylon webbing or other appropriate material having strength adequate to hold and restrain the load, and which is attached at one end to a connector fitting 20 of a known construction for attaching that end of the belt to a hook 21 typically projecting downwardly from the underside of the truck bed near its edge 15. The connector 20 may be formed as a flat rigid plate of steel or other metal containing an opening 22 through which hook 21 may extend to effect attachment of element 20 to the hook, and containing also an elongated slit or opening 23 through which an end portion of belt 19 extends in the manner illustrated in FIGS. 2 and 3. After such extension through slit 23, the belt end is doubled back and stitched to itself at 24 to form a loop which effectively secures the belt to connector 20.

Figure 5:
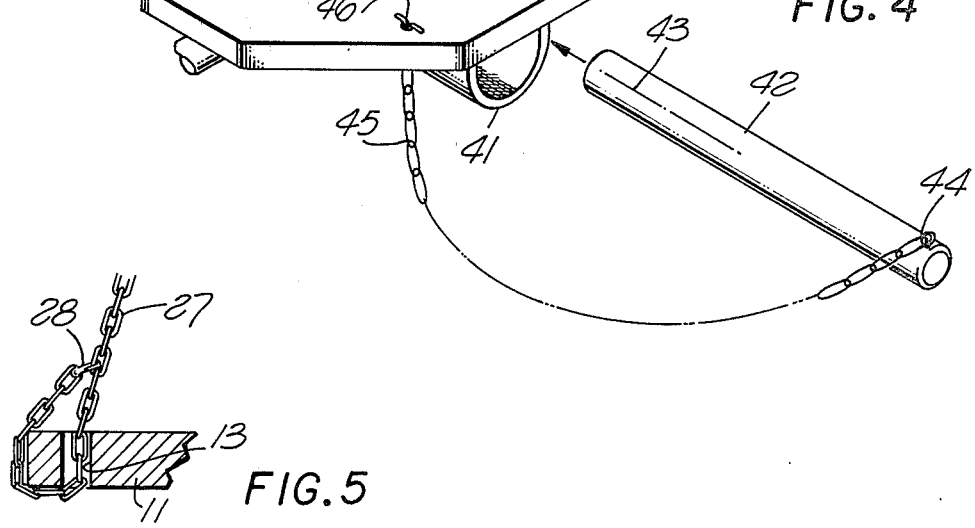
FIG. 5 is a fragmentary vertical section showing a second way of attaching an end of the chain to a truck bed.

The belt is of a length to extend entirely across the top of the load so that the second end 25 of the belt may be received near and essentially a short distance above the second side edge 14 of the truck bed. This second end of the belt is detachably and adjustably connected to the second edge 14 of the truck bed by a take-up unit 26, including a chain 27 connectable at its opposite ends to the truck bed and the belt respectively. For attaching the chain to the truck, a first end of the chain carries a hook 28, typically attachable to the usual hook rail 29 carried at the underside of bed 11 near one of its edges, or attachable to any other anchoring element or structure which may be provided on the truck bed. Chain 27 may extend downwardly through one of the stake pockets 13 for attchment to the hook rail or other anchoring element 29, or may extend downwardly past the outer edge 14 of the truck bed for attachment to the hook rail or other element. Alternatively, the chain may extend downwardly through the stake pocket and then back upwardly past the outer edge of the truck bed, with the hook 28 then being attached to a link of the chain itself as illustrated in FIG. 5, to form an end loop portion of the chain securing the chain to the truck bed.

The second end of the chain is connected to a buckle 30 which is adjustably attachable to the end 25 of belt 19. Buckle 30 preferably includes a rigid desirably flat plate 31, which may be formed of steel or another appropriate metal or material and is shaped to the outline configuration illustrated in FIG. 3. This plate may have two parallel opposite side edges 32, an end edge 33 extending perpendicular to edges 32, and two angularly converging edges 34 defining a tapering portion of the buckle plate containing an opening 35 by which the plate is attached to the chain. To effect such attachment, a chain coupler 36 may be connected into opening 35 and to an end link of the chain, to movably attach the buckle plate to the end of the chain.

Plate 31 contains an elongated opening or slot 37, which is preferably of the rectangular shape illustrated in FIG. 3, having its longitudinal axis 38 disposed parallel to the edge 33 of the plate. To describe opening 37 somewhat more specifically, it may be defined by two parallel opposite edges 39 extending parallel to the longitudinal axis 38 of the opening, and two parallel shorter edges 40 extending perpendicular to edges 39 and axis 38. The opening 37 and its opposite side edges 39 are of a length just slightly greater than the width w of belt 19, so that the belt can extend through the slit in one direction (downwardly as viewed in FIG. 2), and then back through the slit in the opposite direction to form a belt loop 41 at a side of the buckle plate 31 through which a retaining pin 42 can extend.

Pin 42 is rigid and may be formed of steel or other appropriate material, and in its active position is so located within the belt loop 41 that the longtudinal axis 43 of the pin extends parallel to the longitudinal axis 38 of opening 37. The length x of the pin is greater than the length y of opening 37, so that the pin in the position of FIGS. 2 and 3 can bridge entirely across the opening, with the opposite end portions of the pin contacting the underside of plate 31 as viewed in FIG. 2, in a manner preventing the pin from moving upwardly through the opening and thereby retaining the belt loop 41 against movement through opening 37. The pin 42 may be retained against loss by attachment of an end of the pin at 44 to an end of the chain or other elongated flexible retaining member 45, whose second end is secured at 46 in any appropriate manner to buckle plate 41. As will be understood, the length of chain 45 is of course great enough to permit complete removal of pin 42 axially out of the belt loop 41, to release the belt loop for withdrawal through opening 37 and thus complete detachment from the buckle if desired.

In addition to the parts thus far described, the assembly 18 includes also a load binder 47 which may be of any conventional construction and is adapted to take up slack in the chain to effect the final tightening of the assembly 18 on load 12. This load binder 47 is illustrated as including a first element 48 having a hook 49 detachably connectable to any one of the links 50 of chain 27, and a second element 51 having a hook 52 also adapted for detachable connection to any desired one of the links 50. An actuating lever 53 having a handle portion 54 is pivotally connected at 55 and 56 to elements 48 and 51, and acts by swinging arm 54 in a leftward direction as viewed in FIG. 2 to move pivot point 55 leftwardly relative to pivot point 56 and thus pull the elements 48 and 51 and the connected chain links toward one another to take up slack in the chain. In the final tightened position of lever 53, the pivot points 55 and 56 move to a slightly overcenter relation with respect to one another, to effectively retain the binder in its tightened condition until purposely released by reverse swinging movement of handle 54.

In placing the assembly 18 in use, connector 20 may first be attached to hook 21 at the right side of the truck bed as viewed in FIG. 1, following which the belt 19 is extended upwardly over the top of the load to the condition of FIG. 1. The second end 25 of the belt may be attached to unit 26 either before or after the belt is placed over the load. This connection of the buckle to the belt is effected by merely passing the belt through opening 37 to the condition illustrated in FIGS. 2 and 3, and inserting pin 42 into the belt loop 41 to retain the parts together. The second end of the chain is passed downwardly through one of the stake openings 13, or is extended downwardly past the outer edge of the truck bed, and is attached to the rail 29 or other anchoring member, or may be looped in the manner illustrated in FIG. 5. Buckle 30 is adjusted, either before or after attachment of hook 28 to the truck bed, to a condition in which the belt and chain together essentially conform to and are fairly tight on the load. This adjustment is effected by loosening the belt loop 41 and advancing the belt longitudinally through opening 37 and about the pin until the appropriate condition is reached. Enough tension is then exerted on the belt to tighten the loop about the pin, so that the pin thereafter effectively frictionally retains the loop in a fixed adjusted position relative to the buckle. The hooks 49 and 50 of chain binder 47 are then attached to appropriate links of the chain selected to give a desired ultimate tightness, and the arm and handle 54 of the chain binder is swung in the counter-clockwise direction as viewed in FIG. 2 to shorten the effective length of the chain and tighten the belt and chain combination on the load. If the load shifts in transit in a manner requiring tightening of the assembly 18, this may be effected by releasing the chain binder and either adjusting its points of connection to the chain or adjusting buckle 30, or following both of these procedures before resetting the chain binder.

While a certain specific embodiment of the present invention has been disclosed as typical, the invention is of course not limited to this particular form, but rather is applicable broadly to all such variations as fall within the scope of the appended claims.

I claim:

1. Apparatus for retaining a load on a vehicle bed comprising:
   a belt;
   a connector at a first end of the belt for attaching said end to a first side of the vehicle;
   said belt being adapted to extend upwardly from said first side of the vehicle and over the load to a location near a second side of the vehicle;
   a chain;
   a hook carred by the chain at a first end thereof for attaching it to said second side of the vehicle;
   a buckle assembly attached to the second end of said chain connectable to the second end of said belt and constructed to enable adjustment of said second end of the belt relative to the buckle to conform the overall combined length of the belt and chain together essentially to the size of the load; and
   a load binder adapted to be connected to the chain and including an actuating arm acting by swinging movement from a first position to a second position to take up slack in the chain in a manner tightening the belt on the load;
   said buckle assembly including a rigid plate connected to said second end of the chain and containing an elongated generally rectangular opening through which said second end of the belt extends first in one direction and then back in the opposite direction to form a loop at one side of said plate, and an elongated pin formed separately from and movable relative to said plate and adapted to extend through said loop of the belt at said side of the plate and of a length greater than the length of said opening to bridge entirely across the length of the opening so that opposite ends of the pin engage said plate beyond both of two opposite ends of said elongated opening in a relation preventing the pin from moving through the opening and thereby binding the belt loop and retaining the belt against longitudinal movement relative to said plate in any of different adjusted positions of the belt.

2. Apparatus as recited in claim 1, including a flexible element connected at one end to said plate and at its opposite end to said pin to retain the pin against detachment from the plate while permitting removal of the pin from within said loop in the belt.

3. Apparatus as recited in claim 2, including said vehicle as an element of the claim, with said connector attached to a first side of the vehicle and said hook attached to said second side of the vehicle.

4. For use with a vehicle and a load retaining belt attached at a first end of the belt to a first side of the vehicle and extending upwardly over a load to a location near a second side of the vehicle; apparatus for adjustably connecting the second end of the belt to said second side of the vehicle comprising:
   a chain whose effective length can be adjusted by a load binder;
   a hook at a first end of the chain for attaching it to said second side of the vehicle; and a buckle assembly at the second end of said chain connectable to said second end of the belt in a relation enabling longitudinal adjustment of the belt relative to the buckle to tighten the belt against the vehicle load;
   said buckle assembly including an element connected to said second end of the chain and containing an opening through which said second end of the belt extends first in one direction and then back in the opposite direction to form a loop at a side of the element, and a pin formed separately from and movable relative to said element and adapted to extend through said loop in the belt at said side of the element and of a length to bridge entirely across said opening and engage said element at opposite sides of the opening in a relation preventing movement of said pin through the opening and binding the belt against longitudinal movement in any of different adjusted positions.

5. Apparatus as recited in claim 4, including a flexible connector attached at one end to said element and at its opposite end to said member to secure the member against detachment from said element while permitting removal of said member from said belt loop.

6. Apparatus as recited in claim 4, including a load binder connectable to said chain and having an actuating arm acting by swinging movement from a first position to a second position to take up slack in the chain and thereby tighten the chain and belt against the load.

7. Apparatus as recited in claim 4, in which said element is a rigid essentially flat plate connected to said second end of the chain, said opening in said element being an elongated essentially rectangular opening, said pin being adapted to bridge entirely across the length of said elongated opening, there being an elongated flexible member attaching said pin to said plate while permitting removal of the pin from said belt loop, and a load binder comprising two elements connectable to different links of said chain and an actuating arm acting by swinging movement from a first position to a second position to pull said elements and the connected links toward one another and tighten the belt against the load.

\* \* \* \* \*